US012595777B2

(12) United States Patent
Bertenyi et al.

(10) Patent No.: US 12,595,777 B2
(45) Date of Patent: Apr. 7, 2026

(54) RELATING TO ENERGY STORAGE

(71) Applicant: Rheenergise Limited, London (GB)

(72) Inventors: Tamas Bertenyi, Montreal (CA); Christian Porowski, Montreal (CA)

(73) Assignee: Rheenergise Limited, London (GB)

( * ) Notice: Subject to any disclaimer, the term of this patent is extended or adjusted under 35 U.S.C. 154(b) by 0 days.

(21) Appl. No.: 18/713,761

(22) PCT Filed: Nov. 30, 2022

(86) PCT No.: PCT/IB2022/061578
§ 371 (c)(1),
(2) Date: May 28, 2024

(87) PCT Pub. No.: WO2023/100093
PCT Pub. Date: Jun. 8, 2023

(65) Prior Publication Data
US 2025/0027472 A1 Jan. 23, 2025

(30) Foreign Application Priority Data
Dec. 1, 2021 (GB) ..................................... 2117345

(51) Int. Cl.
*F03B 13/06* (2006.01)

(52) U.S. Cl.
CPC ........... *F03B 13/06* (2013.01); *F05B 2210/11* (2013.01); *F05B 2260/205* (2013.01); *F05B 2260/821* (2013.01); *F05B 2270/303* (2013.01)

(58) Field of Classification Search
CPC .......... F03B 13/06; F03B 13/10; Y02E 10/10; Y02E 10/20; Y02E 60/14
See application file for complete search history.

(56) References Cited

U.S. PATENT DOCUMENTS 3,939,356 A * 2/1976 Loane ........................ F02C 6/16 60/398
8,127,542 B1 * 3/2012 Dolcimascolo ....... F03B 17/005 60/398

(Continued)

FOREIGN PATENT DOCUMENTS

CN 113373876 A 9/2021
DE 10143638 A1 3/2003

(Continued)

OTHER PUBLICATIONS

European Patent Office, International Search Report, International Application No. PCT/IB2022/061578, Mailed Feb. 17, 2023, 2 Pages.

(Continued)

*Primary Examiner* — Michael Leslie

(74) *Attorney, Agent, or Firm* — Ziegler IP Law Group, LLC.

(57) ABSTRACT

The present disclosure proposes a system for storing energy. The system includes upper and lower reservoirs, a working fluid, and a conduit arranged to permit flow of the working fluid from the upper reservoir to the lower reservoir under gravity. The conduit has a turbine generator arranged to be driven by the flow of the working fluid to generate energy. A heat transfer device is arranged to transfer heat to and/or from the upper reservoir and/or lower reservoir.

19 Claims, 3 Drawing Sheets

(56) References Cited

U.S. PATENT DOCUMENTS

| | | | | |
|---|---|---|---|---|
| 11,274,648 B2 * | 3/2022 | Sankrithi | F03B 15/02 |
| 11,359,597 B2 * | 6/2022 | Olson | F28D 1/022 |
| 2017/0082123 A1 | 3/2017 | Momen et al. | |
| 2023/0250603 A1 * | 8/2023 | Gudesen | F03G 4/026 60/670 |

FOREIGN PATENT DOCUMENTS

| | | | |
|---|---|---|---|
| JP | S63143388 | A | 6/1988 |
| WO | 2015118527 | A1 | 8/2015 |
| WO | 2016094989 | A1 | 6/2016 |
| WO | 2019202456 | A1 | 10/2019 |

OTHER PUBLICATIONS

United Kingdom Intellectual Property Office, Combined Search and Examination Report under Sections 17 and 18(3) issued for United Kingdom Patent Application GB2117345.5, on Dec. 17, 2021, 06 Pages.

* cited by examiner

RELATING TO ENERGY STORAGE

TECHNICAL FIELD

This invention relates to energy storage using fluids. In particular, though not exclusively, this invention relates to a system for storing energy and to a method of storing and generating energy.

BACKGROUND

Renewable energy sources, such as wind and solar, have highly variable energy outputs. On-grid energy storage therefore plays a crucial role in smoothing out the electricity supply from these sources and ensuring that the supply of energy matches demand. As the world becomes increasingly reliant on renewable energy sources to generate electricity, the need for reliable energy storage technologies is becoming ever more important.

Energy storage at grid scale is well established in the form of Pumped Hydro Storage (PHS) systems. In such systems, during times of low on-grid electricity demand, water is typically pumped from a lower-level reservoir to an upper-level reservoir, thereby gaining potential energy. The water is then stored in the upper-level reservoir until times of high on-grid electricity demand. At such times, the water is allowed to flow from the upper reservoir back to the lower reservoir through a penstock. The water turns a turbine located in the penstock to generate electricity that is then sent to the grid to help meet the high electricity demand.

More recently, alternative fluids to water have been investigated for use in PHS systems. It has been found that the use of high-density fluids, i.e. fluids having a density greater than that of water at the same temperature and pressure, can be highly beneficial in PHS. For example, the use of high-density fluids in PHS systems can reduce the requirement for vertical elevation between the upper and lower-level reservoirs compared to conventional PHS systems that use water.

However, a drawback with using high-density fluids in PHS systems is that they can be very sensitive to changes in temperature. If the temperature of the high-density fluid decreases below a critical point, the viscosity may increase dramatically, and this can have a material impact on the performance and economics of PHS. Moreover, if the temperature of the high-density fluid increases past an upper limit, this may also impact operation of the PHS system. Hence, there remains a need for improved PHS systems that can overcome the aforementioned drawback.

It is an object of the invention to address at least one of the above problems, or another problem associated with the prior art.

SUMMARY OF THE INVENTION

A first aspect of the invention provides a system for storing energy comprising: upper and lower reservoirs; a working fluid; and a conduit arranged to permit flow of the working fluid from the upper reservoir to the lower reservoir under gravity, the conduit comprising a turbine generator arranged to be driven by the flow of the working fluid through the conduit to generate energy; and a heat transfer device arranged to transfer heat to and/or from the upper and/or lower reservoir.

Suitably, the heat transfer device may be arranged to transfer heat to and/or from working fluid in the upper and/or lower reservoir. The working fluid may, for example, comprise a high-density fluid, i.e. a fluid having a density greater than that of water at the same temperature and pressure. In some embodiments, the working fluid may comprise water.

This presence of a heat transfer device may advantageously allow the upper and/or lower reservoir to be heated or cooled, thereby allowing the temperature of working fluid in the upper and/or lower reservoir to be maintained at a safe operating temperature, i.e. a temperature (or temperature range) in which the viscosity of the working fluid is optimal, in many climates and seasons.

In some embodiments, the heat transfer device may be arranged to transfer heat generated by the turbine generator to the upper and/or lower reservoir. For example, the heat transfer device may be arranged to transfer heat generated by the turbine generator to working fluid in the upper and/or lower reservoir.

Suitably, the heat transfer device may be arranged to transfer waste heat generated by the turbine generator to the upper and/or lower reservoir. Waste heat refers to the residual heat given off by the turbine generator that is not converted into useful energy, for example electrical or mechanical energy. The turbine generator may comprise one or more parts selected from a turbine, a drive shaft, a motor, a generator and/or a power electronics drive system. Suitably, the heat transfer device may be arranged to transfer heat generated by one or more parts of the turbine generator to the upper and/or lower reservoir. For example, the heat transfer device may be arranged to transfer waste heat generated by one or more parts of the turbine generator to the upper and/or lower reservoir.

In this way, heat generated by the system that would otherwise dissipate into the surrounding environment may advantageously be harnessed to heat the upper and/or lower reservoir.

In some embodiments, the heat transfer device may be arranged to transfer heat from a geothermal borehole to the upper and/or lower reservoir. For example, the heat transfer device may be arranged to transfer heat from a geothermal borehole to working fluid in the upper and/or lower reservoir.

A geothermal borehole may advantageously provide a source of renewable heat energy that is not affected by seasonal changes in temperature. Furthermore, a geothermal borehole may be relatively cheap to install if it is built at the same time as the upper and/or lower reservoir is constructed (particularly if it is constructed in the near vicinity of the upper and/or lower reservoir), as the machinery and engineering expertise required to build it may be readily available. In addition, any earth extracted from excavation to build the geothermal borehole may be advantageously used to partially insulate the upper and/or lower reservoir.

In some embodiments, the heat transfer device may be arranged to transfer heat from the upper and/or lower reservoir to a geothermal borehole. For example, the heat transfer device may be arranged to transfer heat from working fluid in the upper and/or lower reservoir to a geothermal borehole.

Thus, a geothermal borehole may advantageously provide a heat sink for allowing excess heat from the upper and/or lower reservoir to be rejected to the ground. Moreover, this may also advantageously maintain the long-term health of the geothermal borehole.

In some embodiments, the heat transfer device may comprise a heat pump. The heat pump may suitably carry out multiple roles. For example, the heat pump may be able to transfer heat to and/or from the upper and/or lower reservoir.

In some embodiments, the heat transfer device may comprise one or more pipes extending between the heat pump and the upper and/or lower reservoir.

In some embodiments, the heat transfer device may comprise a heat transfer fluid disposed within the one or more pipes. The heat transfer fluid may comprise a refrigerant selected from water, carbon dioxide, ethylene glycol, propylene glycol, ethane, propane, butane, pentane, hexane, ethylene, ammonia, hydrofluorocarbons, fluorocarbons, silicon oil and mixtures thereof.

In some embodiments, the one or more pipes may be in fluid connection with one or more heat exchangers arranged within the upper and/or lower reservoir.

In some embodiments, the upper and/or lower reservoir may comprise a resistor bank. A resistor bank (or resistive load bank) is a device that converts electrical energy to heat energy. Suitably, the resistor bank may comprise one or more resistors.

Suitably, the resistor bank may be arranged to receive electrical energy from an electricity supply grid. In this way, the resistor bank may advantageously convert excess electrical energy from the electricity supply grid into heat energy that can be used to heat the upper and/or lower reservoir.

In some embodiments, excess heat energy from the heat transfer device and/or resistor bank may be stored in the upper and/or lower reservoir. Excess heat energy in this context refers to an amount of heat energy that may heat the working fluid in the upper and/or lower reservoir to a temperature greater than the temperature (or temperature range) required to provide an optimal viscosity of the working fluid. Suitably, the excess heat energy may be utilised, for example, to provide local district heating for a nearby industrial site, commercial site or town. Thus, the system may advantageously be able to provide both electrical energy storage and thermal (heat) energy storage, without significant additional cost.

In some embodiments, the upper and/or lower reservoir may comprise an agitator. Suitably, the agitator may comprise a pump and nozzle for recirculating the working fluid in the upper and/or lower reservoir. The nozzle may, for example, be a jet nozzle. Additionally, or alternatively, the agitator may comprise an impeller, optionally mounted on a vertical shaft. Additionally, or alternatively, the agitator may comprise an air sparger. The agitator may advantageously help maintain a generally homogenous temperature of working fluid in the upper and/or lower reservoir.

In some embodiments, the working fluid may have a specific gravity with respect to water in the range of from 1.4 to 3.0. For example, the working fluid may have a specific gravity with respect to water in the range of from 1.8 to 2.8.

In some embodiments, the working fluid may comprise mineral particles and a surfactant. For example, the working fluid may comprise a suspension of mineral particles and a surfactant in a solvent such as water.

In some embodiments, the system may comprise a pump arranged to transfer the working fluid from the lower reservoir to the upper reservoir. The pump may suitably be arranged in the conduit.

Additionally, or alternatively, the turbine generator may be arranged to be driven in reverse to transfer the working fluid from the lower reservoir to the upper reservoir. For example, the turbine generator may be arranged to be driven in reverse using electrical energy to transfer the working fluid from the lower reservoir to the upper reservoir. Suitably, the turbine generator may comprise a reversible pump-turbine arranged to be driven in reverse using electrical energy to transfer the working fluid from the lower reservoir to the upper reservoir. The electrical energy may come from an electricity supply grid connected to the system.

In some embodiments, the system may comprise a computing arrangement. The computing arrangement may, in operation, execute a predictive temperature control model. The computing arrangement may be configured to receive data related to the temperature of the upper and/or lower reservoir. For example, the computing arrangement may be configured to receive data related to the temperature of working fluid in the upper and/or lower reservoir.

The computing arrangement may use the predictive temperature control model to determine a predicted temperature for the upper and/or lower reservoir. For example, the computing arrangement may use the predictive temperature control model to determine a predicted temperature for working fluid in the upper and/or lower reservoir.

Suitably, the computing arrangement may activate the heat transfer device when the predicted temperature falls outside a predefined operating range (and/or below a predetermined threshold). For example, the computing arrangement may turn on the heat transfer device when the predicted temperature falls outside a predefined operating range (and/or below a predetermined threshold). In some embodiments, the computing arrangement may increase the rate of heat transfer by the heat transfer device when the predicted temperature falls outside a predefined operating range (and/or below a predetermined threshold).

Suitably, the computing arrangement may deactivate the heat transfer device when the predicted temperature falls within a predefined operating range (and/or above a predetermined threshold). For example, the computing arrangement may turn off the heat transfer device when the predicted temperature falls inside a predefined operating range (and/or above a predetermined threshold). In some embodiments, the computing arrangement may decrease the rate of heat transfer by the heat transfer device when the predicted temperature falls inside a predefined operating range (and/or above a predetermined threshold).

In some embodiments, the computing arrangement may be configured to receive data relating to current and/or forecast weather conditions.

In some embodiments, the upper and/or lower reservoir may comprise a temperature sensor. A second aspect of the invention provides a method of storing and generating energy, the method comprising the steps of:

- transferring a working fluid from a lower reservoir to an upper reservoir;
- storing the working fluid in the upper reservoir for a period of time;
- permitting flow of the working fluid from the upper reservoir to the lower reservoir under gravity through a conduit connecting the upper and lower reservoirs, the conduit comprising a turbine generator arranged to be driven by the flow of the working fluid through the conduit to generate energy; and
- transferring heat to and/or from the upper and/or lower reservoir to maintain the temperature of the upper and/or lower reservoir within a predefined operating range.

Suitably, the method may comprise transferring heat to and/or from working fluid in the upper and/or lower reservoir to maintain the temperature of the working fluid within a predefined operating range.

In some embodiments, the method may comprise transferring heat generated by the turbine generator to the upper and/or lower reservoir. For example, the method may comprise transferring heat generated by the turbine generator to working fluid in the upper and/or lower reservoir. Suitably, the method may comprise transferring waste heat generated by the turbine generator to the upper and/or lower reservoir. The turbine generator may comprise one or more parts selected from a turbine, a drive shaft, a motor, a generator and/or a power electronics drive system. Suitably, the method may comprise transferring heat generated by one or more of parts of the turbine generator to the upper and/or lower reservoir. For example, the method may comprise transferring waste heat generated by one or more of parts of the turbine generator to the upper and/or lower reservoir.

In some embodiments, the method may comprise transferring heat from a geothermal borehole to the upper and/or lower reservoir and/or transferring heat from the upper and/or lower reservoir to a geothermal borehole. For example, the method may comprise transferring heat from a geothermal borehole to working fluid in the upper and/or lower reservoir and/or transferring heat from working fluid in the upper and/or lower reservoir to a geothermal borehole.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
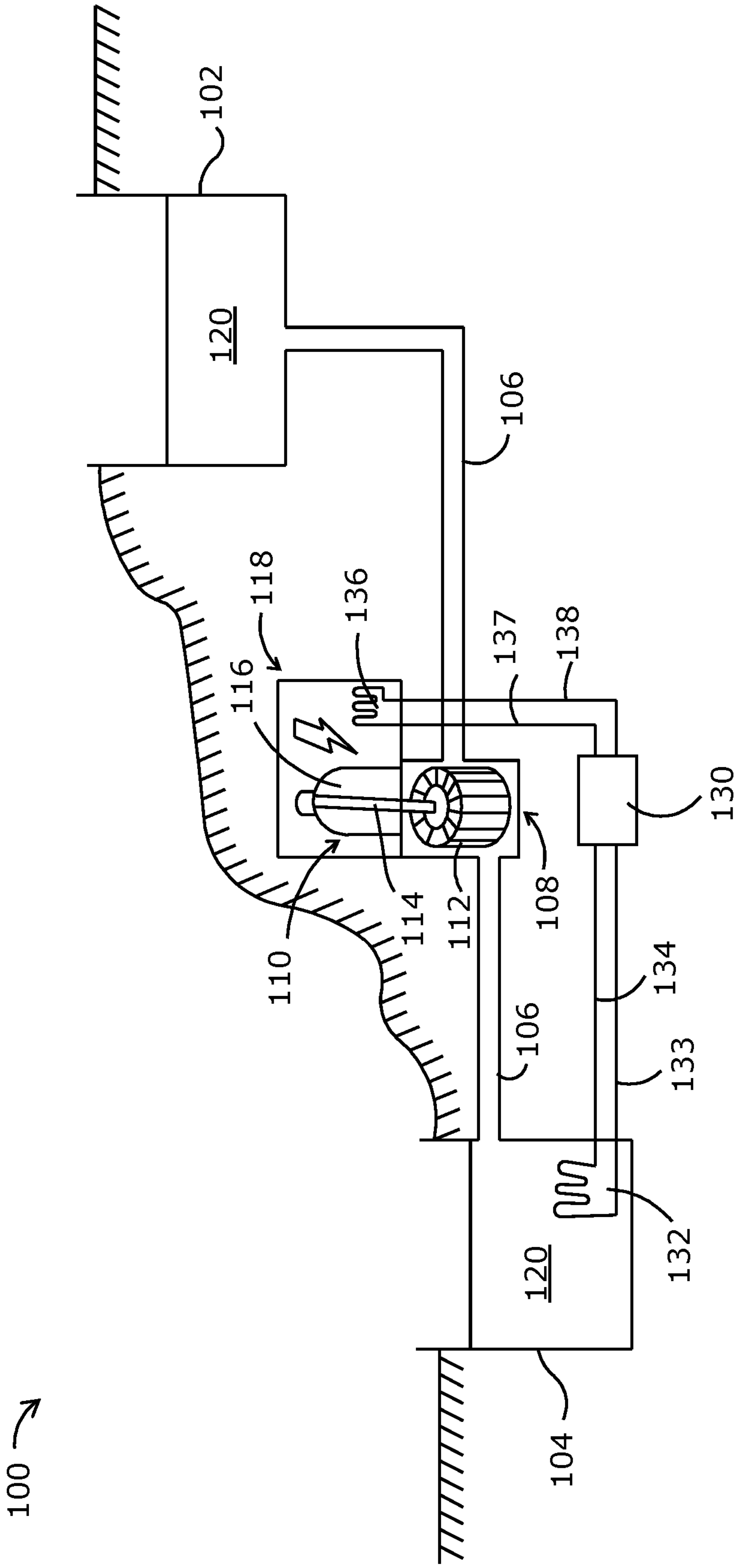
FIG. 1 is an illustration of a system in accordance with a first embodiment of the invention arranged to transfer waste heat from a turbine generator to a reservoir.

Referring to FIG. 1, a system 100 for storing energy according to a first embodiment of the invention has upper and lower reservoirs 102, 104 connected by an underground conduit 106. The conduit 106 feeds in and out of a penstock 108, which houses a turbine 112 of a turbine generator 110. The turbine generator 110 also comprises a generator unit 116 arranged inside a powerhouse 118 situated directly above the penstock 108. The turbine generator 110 further comprises a shaft 114, which extends vertically upwards from and connects the turbine 112 to the generator unit 116. The upper and lower reservoirs 102, 104 and the conduit 106 contain a working fluid 120. In this particular example, the working fluid 120 is a slurry comprising a suspension of mineral particles and a surfactant in water.

The system 100 also comprises a heat pump 130, which is connected to a heat exchanger 132 located in the lower reservoir 104. The heat exchanger 132 is connected to the heat pump 130 by two pipes 133, 134. In some alternative embodiments of the invention, the heat pump 130 may also/instead be connected to a heat exchanger located in the upper reservoir 102. The heat pump 130 is also connected to a heat exchanger 136 located in the powerhouse 118 by two pipes 137, 138. The heat pump 130, heat exchangers 132, 136 and pipes 133, 134, 137, 138 are filled with a heat transfer fluid 140. In this particular example, the heat transfer fluid 140 is a mixture of 40% ethylene glycol in water.

During times of low on-grid electricity demand, or when there is an excess of electricity on-grid, the turbine 112 may be driven in reverse using electrical energy to pump the working fluid 120 through the conduit 106 from the lower reservoir 104 to the upper reservoir 102. In this way, the working fluid 120 gains potential energy. The working fluid 120 may be stored in the upper reservoir 102 until such time that the system 100 is required to generate energy, for example, at times of high on-grid electricity demand. At such times, the working fluid 120 is allowed to flow back through the conduit 106 from the upper reservoir 102 to the lower reservoir 104 through the penstock 108. The flow of the working fluid 120 through the penstock 108 rotates the turbine 112 and the shaft 114, thereby resulting in the generation of electrical energy by the generator unit 116. This electrical energy may then be sent to the electricity grid (not shown in FIG. 1) to help meet the high electricity demand.

The turbine generator 110 generates waste heat both when it is being used to drive the turbine 112 in reverse to pump the working fluid 120 from the lower reservoir 104 to the upper reservoir 102, and when it is being used to generate electricity from the flow of the working fluid 120 from the upper reservoir 102 to the lower reservoir 104. In this particular example, the power conversion efficiency of the turbine generator 110 averages from around 90 to 95% while the remaining 5 to 10% is lost as heat.

When the operating temperature of the working fluid 102 in the system 100 falls below the lower end of its safe operating range, the heat pump 130 circulates the heat transfer fluid 140 between the heat exchangers 132, 136 via the pipes 133, 134, 137, 138. The heat transfer fluid 140 flows from the heat pump 130 to the heat exchanger 136 in the powerhouse 118 via pipe 137. The heat transfer fluid 140 then flows through the heat exchanger 136, absorbing the waste heat energy dissipated by the generator unit 116. This waste heat waste may in particular come from the motor/generator and power electronics drives in the generator unit 116. This raises the temperature of the heat transfer fluid 140. The warm heat transfer fluid 140 then flows back through pipe 138 to the heat pump 130, whereby it is sent along pipe 133 until it reaches the heat exchanger 132 in the lower reservoir 104. Heat energy is then dissipated from the heat transfer fluid 140 through the heat exchanger 132 into the working fluid 120. This raises the temperature of the working fluid 120 in the lower reservoir 104 back to its safe operating range.

Figure 2:
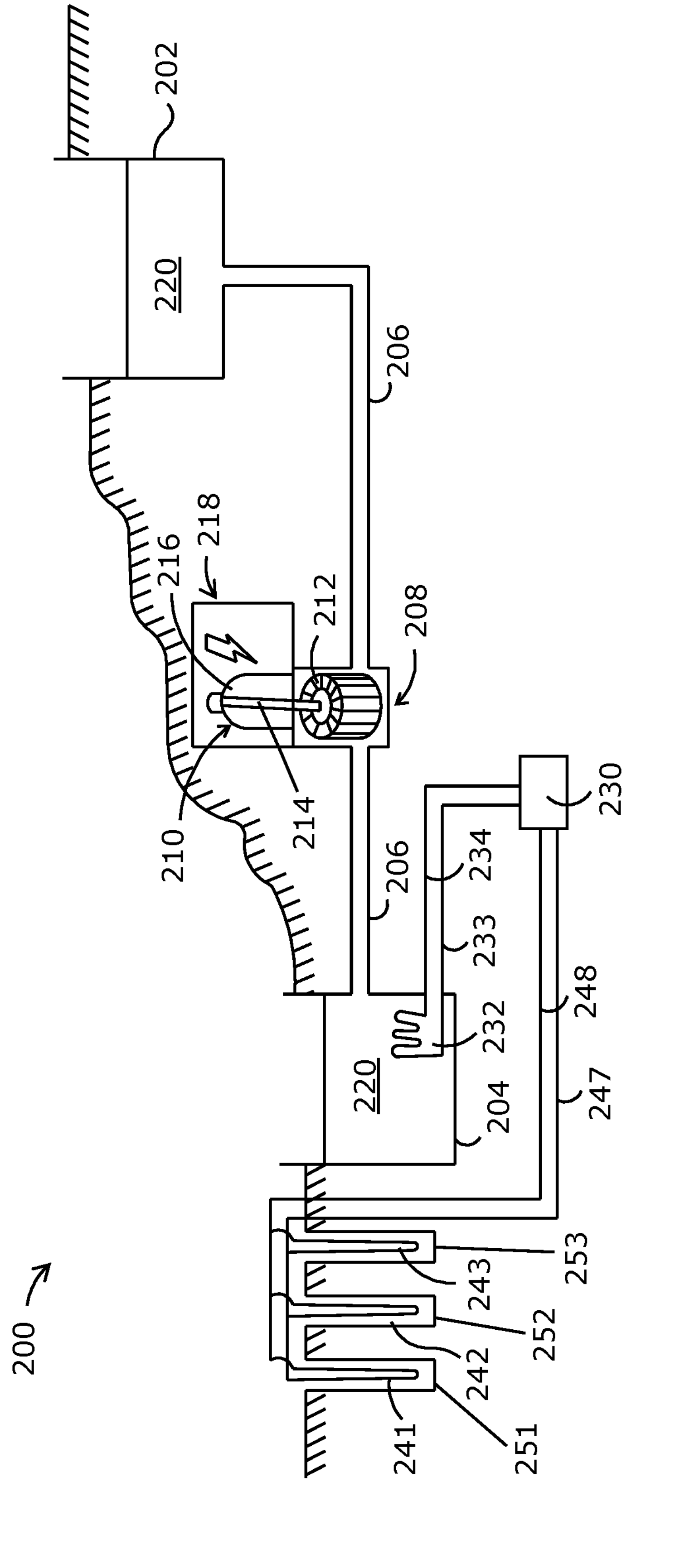
FIG. 2 is an illustration of a system in accordance with a second embodiment of the invention arranged to transfer heat between a geothermal borehole and a reservoir.

Referring now to FIG. 2, a system 200 for storing energy according to a second embodiment of the invention has upper and lower reservoirs 202, 204 connected by an underground conduit 206. The conduit 206 feeds in and out of a penstock 208, which houses a turbine 212 of a turbine generator 210. The turbine generator 210 also comprises a generator unit 216 arranged inside a powerhouse 218 situated directly above the penstock 208. The turbine generator 210 further comprises a shaft 214, which extends vertically upwards from and connects the turbine 212 to the generator unit 216. The upper and lower reservoirs 202, 204 and the conduit 206 contain a working fluid 220. In this particular example, the working fluid 220 is a slurry comprising a suspension of mineral particles and a surfactant in water.

The system 200 also comprises a heat pump 230, which is connected to a heat exchanger 232 located in the lower reservoir 204. The heat exchanger 232 is connected to the heat pump 230 by two pipes 233, 234. In some alternative embodiments of the invention, the heat pump 230 may also/instead be connected to a heat exchanger located in the upper reservoir 302. The heat pump 230 is also connected to a series of three heat exchangers 241, 242, 243 located respectively in a series of three geothermal boreholes 251, 252, 253 located in the ground nearby the lower reservoir 204. The heat pump 230 is connected to the series of three heat exchangers 241, 242, 243 by two pipes 247, 248. The heat pump 230, heat exchangers 232, 241, 242, 243 and pipes 233, 234, 247, 248 are filled with a heat transfer fluid 240. In this particular example, the heat transfer fluid 240 is a mixture of 40% ethylene glycol in water.

During times of low on-grid electricity demand, or when there is an excess of electricity on-grid, the turbine 212 may be driven in reverse using electrical energy to pump the working fluid 220 through the conduit 206 from the lower reservoir 204 to the upper reservoir 202. In this way, the working fluid 220 gains potential energy. The working fluid 220 may be stored in the upper reservoir 202 until such time that the system 200 is required to generate energy, for example, at times of high on-grid electricity demand. At such times, the working fluid 220 is allowed to flow back through the conduit 206 from the upper reservoir 202 to the lower reservoir 204 through the penstock 208. The flow of the working fluid 220 through the penstock 208 rotates the turbine 212 and the shaft 214, thereby resulting in the generation of electrical energy by the generator unit 216. This electrical energy may then be sent to the electricity grid (not shown in FIG. 2) to help meet the high electricity demand.

When the operating temperature of the working fluid 202 in the system 200 falls below the lower end of its safe operating range, for example during winter or on a particularly cold day, the heat pump 230 circulates the heat transfer fluid 240 between the heat exchangers 232, 241, 242, 243 via the pipes 233, 234, 247, 248. The heat transfer fluid 240 flows from the heat pump 230 to the series of three heat exchangers 241, 242, 243 located in their respective geothermal boreholes 251, 252, 253. The heat transfer fluid 240 absorbs heat from the geothermal boreholes 251, 252, 253, which raises the temperature of the heat transfer fluid 240. The warm heat transfer fluid 240 then flows back through pipe 248 to the heat pump 230, whereby it is sent along pipe 233 until it reaches the heat exchanger 232 in the lower reservoir 204. Heat energy is then dissipated from the heat transfer fluid 240 through the heat exchanger 232 into the working fluid 220. This raises the temperature of the working fluid 220 in the lower reservoir 204 back to its safe operating range.

When the operating temperature of the working fluid 220 in the system 200 rises above the upper end of its safe operating range, for example during summer or on a particularly hot day, the heat pump 230 circulates the heat transfer fluid 240 between the heat exchangers 232, 241, 242, 243 via the pipes 233, 234, 247, 248 in the reverse direction. Thus, the heat transfer fluid 240 flows from the heat pump 230 along pipe 233 until it reaches the heat exchanger 232 in the lower reservoir 204. The heat transfer fluid 240 absorbs heat from the working fluid 220 in the lower reservoir 204. The warm heat transfer fluid 240 then flows back through pipe 234 to the heat pump 230, whereby it is sent along pipe 247 until it reaches the series of three heat exchangers 241, 242, 243 located in their respective geothermal boreholes 251, 252, 253. Heat energy is then dissipated from the heat transfer fluid 240 into the three geothermal boreholes 251, 252, 253. This lowers the temperature of the working fluid 220 in the lower reservoir 204 back to its safe operating range.

Figure 3:
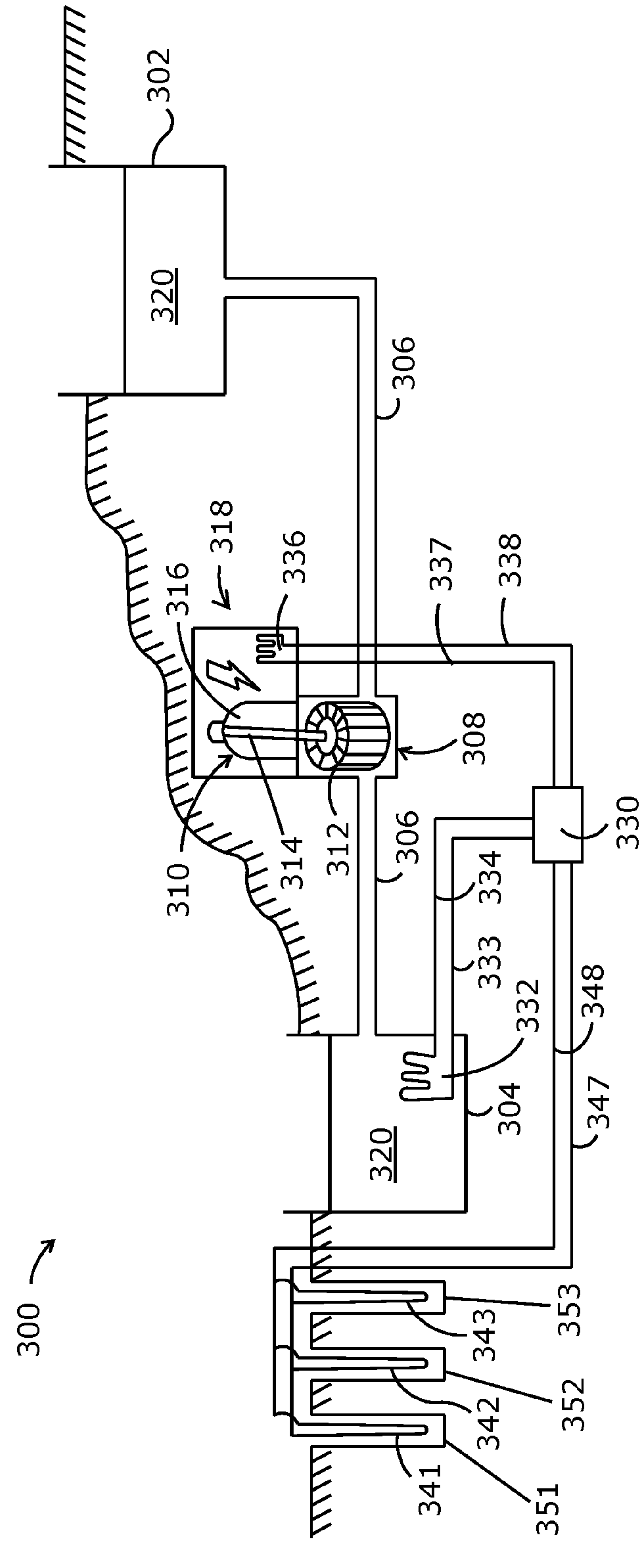
FIG. 3 is an illustration of a system in accordance with a third embodiment of the invention arranged to transfer heat between a turbine generator, a geothermal borehole, and a reservoir.

Referring now to FIG. 3, a system 300 for storing energy according to a third embodiment of the invention has upper and lower reservoirs 302, 304 connected by an underground conduit 306. The conduit 306 feeds in and out of a penstock 308, which houses a turbine 312 of a turbine generator 310. The turbine generator 310 also comprises a generator unit 316 arranged inside a powerhouse 318 situated directly above the penstock 308. The turbine generator 310 further comprises a shaft 314, which extends vertically upwards from and connects the turbine 312 to the generator unit 316. The upper and lower reservoirs 302, 304 and the conduit 306 contain a working fluid 320. In this particular example, the working fluid 320 is a slurry comprising a suspension of mineral particles and a surfactant in water.

The system 300 also comprises a heat pump 330, which is connected to a heat exchanger 332 located in the lower reservoir 304. The heat exchanger 332 is connected to the heat pump 330 by two pipes 333, 334. In some alternative embodiments of the invention, the heat pump 330 may also/instead be connected to a heat exchanger located in the upper reservoir 302.

The heat pump 330 is also connected to a heat exchanger 336 located in the powerhouse 318 by two pipes 337, 338. Furthermore, the heat pump 330 is also connected to a series of three heat exchangers 341, 342, 343 located respectively in a series of three geothermal boreholes 351, 352, 353 located in the ground nearby the lower reservoir 304. The heat pump 330, heat exchangers 332, 336, 341, 342, 343 and pipes 333, 334, 337, 338, 347, 348 are filled with a heat transfer fluid 340. In this particular example, the heat transfer fluid 340 is a mixture of 40% ethylene glycol in water.

During times of low on-grid electricity demand, or when there is an excess of electricity on-grid, the turbine 312 may be driven in reverse using electrical energy to pump the working fluid 320 through the conduit 306 from the lower reservoir 304 to the upper reservoir 302. In this way, the working fluid 320 gains potential energy. The working fluid 320 may be stored in the upper reservoir 302 until such time that the system 300 is required to generate energy, for example, at times of high on-grid electricity demand. At such times, the working fluid 320 is allowed to flow back through the conduit 306 from the upper reservoir 302 to the lower reservoir 304 through the penstock 308. The flow of the working fluid 320 through the penstock 308 rotates the turbine 312 and the shaft 314, thereby resulting in the generation of electrical energy by the generator unit 316.

This electrical energy may then be sent to the electricity grid (not shown in FIG. 3) to help meet the high electricity demand.

When the operating temperature of the working fluid 320 in the system 300 falls below the lower end of its safe operating range, for example during winter or on a particularly cold day, the heat pump 330 circulates the heat transfer fluid 340 between the heat exchangers 332, 336, 341, 342, 343 via the pipes 333, 334, 337, 338, 347, 348. The heat transfer fluid 340 first flows from the heat pump 330 to the heat exchanger 336 in the powerhouse 318 via pipe 337. The heat transfer fluid 340 then flows through the heat exchanger 336, absorbing the waste heat energy dissipated by the generator unit 316. This waste heat waste may in particular come from the motor/generator and power electronics drives in the generator unit 316. This raises the temperature of the heat transfer fluid 340.

The warm heat transfer fluid 340 then flows back through pipe 338 to the heat pump 330, whereby it is sent along pipe 347 until it reaches the series of three heat exchangers 341, 342, 343 located in their respective geothermal boreholes 351, 352, 353. The heat transfer fluid 340 absorbs further heat from the geothermal boreholes 351, 352, 353, which further raises the temperature of the heat transfer fluid 340. The further warmed heat transfer fluid 340 then flows back through pipe 348 to the heat pump 330, whereby it is sent along pipe 333 until it reaches the heat exchanger 332 in the lower reservoir 304. Heat energy is then dissipated from the further warmed heat transfer fluid 340 through the heat exchanger 332 into the working fluid 320. This raises the temperature of the working fluid 320 in the lower reservoir 304 back to its safe operating range.

When the operating temperature of the working fluid 320 in the system 300 rises above the upper end of its safe operating range, for example during summer or on a particularly hot day, the heat pump 330 circulates the heat transfer fluid 340 between the heat exchangers 332, 341, 342, 343 via the pipes 333, 334, 347, 348 in the reverse direction. Thus, the heat transfer fluid 340 flows from the heat pump 330 along pipe 333 until it reaches the heat exchanger 332 in the lower reservoir 304. The heat transfer fluid 340 absorbs heat from the working fluid 320 in the lower reservoir 304. The warm heat transfer fluid 340 then flows back through pipe 334 to the heat pump 330, whereby it is sent along pipe 347 until it reaches the series of three heat exchangers 341, 342, 343 located in their respective geothermal boreholes 351, 352, 353. Heat energy is then dissipated from the heat transfer fluid 340 into the three geothermal boreholes 351, 352, 353. This lowers the temperature of the working fluid 302 in the lower reservoir 304 back to its safe operating range.

The systems 100, 200, 300 for storing energy according to the first to third embodiments of the invention described above may also include a resistor bank (not shown in the Figures) in the upper and/or lower reservoir 102, 202, 302, 104, 204, 304. The resistor bank may comprise a plurality of resistors arranged to convert electrical energy to heat energy.

The resistor bank may be arranged to receive electrical energy from an electricity supply grid. In this way, the resistor bank may advantageously convert excess electrical energy from the electricity supply grid into heat energy that can be used to heat the working fluid 120, 220, 320 in the upper and/or lower reservoir 102, 202, 302, 104, 204, 304.

The working fluid 120, 220, 320 can also serve as a heat sink for excess power on an electricity supply grid. Thus, under certain conditions, a grid operator could request to use the system 100, 200, 300 to reject excess electrical power from the electricity supply grid. This could, for example, be required when production of energy exceeds demand due to poor forecasting on the part of the grid operator. This may happen as a result of the grid operator erring on the side of energy surplus, in order to avoid a potentially more harmful energy shortage. Likewise, dynamic market pricing might mean the electricity spot price is low or even negative. In this case, once the excess energy has been used to transfer the working fluid from the lower reservoir 104, 204, 304 to the upper reservoir 102, 202, 302, the resistor bank may be used to shed any remaining excess energy into the working fluid 120, 220, 320, thereby using the fluid thermal mass as a sink. In this manner, heating of the working fluid 120, 220, 320 can be done in part with free or low/cost grid power.

The systems 100, 200, 300 for storing energy according to the first to third embodiments of the invention described above may also include a computing arrangement (not shown in the Figures) that, in operation, executes a predictive temperature control model. The predictive temperature control model may reliably manage the temperature of the working fluid 120, 220, 320.

The computing arrangement may be configured to receive data related to the temperature of the lower reservoir 104, 204, 304. Alternatively, or additionally, the computing arrangement may be configured to receive data related to the temperature of the upper reservoir 102, 202, 302. For example, the upper and/or lower reservoir 102, 202, 302, 104, 204, 304 may comprise a temperature sensor for receiving temperature data. Specifically, the computing arrangement may be configured to receive data related to the temperature of working fluid 120, 220, 320 in the upper and/or lower reservoir 102, 202, 302, 104, 204, 304.

The computing arrangement may use the predictive temperature control model to determine a predicted temperature for the upper and/or lower reservoir 102, 202, 302, 104, 204, 304. For example, the computing arrangement may use the predictive temperature control model to determine a predicted temperature for working fluid 120, 220, 320 in the upper and/or lower reservoir 102, 202, 302, 104, 204, 304.

The computing arrangement may activate the heat pump 130, 230, 330 when the predicted temperature falls outside a predefined operating range (or below a predetermined threshold). For example, the computing arrangement may turn on the heat pump 130, 230, 330 when the predicted temperature falls outside a predefined operating range (or below a predetermined threshold). Additionally, or alternatively, the computing arrangement may increase the rate of heat transfer by increasing the rate of flow of the heat transfer fluid through the heat pump 130, 230, 330 when the predicted temperature falls outside a predefined operating range (or below a predetermined threshold).

Moreover, the computing arrangement may deactivate the heat pump 130, 230, 330 when the predicted temperature falls within the predefined operating range (or above a predetermined threshold). For example, the computing arrangement may turn off the heat pump 130, 230, 330 when the predicted temperature falls inside a predefined operating range (or above a predetermined threshold). Additionally, or alternatively, the computing arrangement may decrease the rate of heat transfer by decreasing the rate of flow of the heat transfer fluid through the heat pump 130, 230, 330 when the predicted temperature falls inside a predefined operating range (or above a predetermined threshold).

The invention claimed is:

1. A system for storing energy comprising:

upper and lower reservoirs;

a working fluid;

a conduit arranged to permit flow of the working fluid from the upper reservoir to the lower reservoir under gravity, the conduit comprising a turbine generator arranged to be driven by the flow of the working fluid to generate energy; and a heat transfer device arranged to transfer heat to and/or from the upper and/or lower reservoir, wherein the heat transfer device comprises a heat pump, and wherein the heat transfer device comprises one or more pipes extending between the heat pump and the upper and/or lower reservoir; and a computing arrangement configured to receive data related to the temperature of the upper and/or lower reservoir, wherein the computing arrangement executes a predictive temperature control model to:

determine a predicted temperature for the upper and/or lower reservoirs, and activate the heat transfer device when the predicted temperature falls outside a defined operating range.

2. The system of claim 1, wherein the heat transfer device is arranged to transfer heat generated by the turbine generator to the upper and/or lower reservoir.

3. The system of claim 1, wherein the heat transfer device is arranged to transfer heat from a geothermal borehole to the upper and/or lower reservoir.

4. The system of claim 1, wherein the heat transfer device is arranged to transfer heat from the upper and/or lower reservoir to a geothermal borehole.

5. The system of claim 1, wherein the heat transfer device comprises a heat transfer fluid disposed within the one or more pipes.

6. The system of claim 1, wherein the one or more pipes are in fluid connection with one or more heat exchangers arranged within the upper and/or lower reservoir.

7. The system of claim 1, wherein the upper and/or lower reservoir comprises a resistor bank.

8. The system of claim 7, wherein the resistor bank is arranged to receive electrical energy from an electricity supply grid.

9. The system of claim 7, wherein the upper and/or lower reservoir comprises an agitator.

10. The system of claim 7, wherein the working fluid has a specific gravity with respect to water in the range of from 1.4 to 3.0.

11. The system of claim 7, wherein the working fluid comprises mineral particles and a surfactant.

12. The system of claim 7, comprising a pump arranged to transfer the working fluid from the lower reservoir to the upper reservoir.

13. The system of claim 7, wherein the turbine generator is arranged to be driven in reverse to transfer the working fluid from the lower reservoir to the upper reservoir.

14. The system of claim 1, wherein the computing arrangement deactivates the heat transfer device when the predicted temperature falls within the defined operating range.

15. The system of claim 1, wherein the computing arrangement is configured to receive data relating to current and/or forecast weather conditions.

16. The system of claim 1, wherein the upper and/or lower reservoir comprises a temperature sensor.

17. A method of storing and generating energy, the method comprising the steps of:

transferring a working fluid from a lower reservoir to an upper reservoir;

storing the working fluid in the upper reservoir; permitting flow of the working fluid from the upper reservoir to the lower reservoir under gravity through a conduit connecting the upper and lower reservoirs, the conduit comprising a turbine generator arranged to be driven by the flow of the working fluid to generate energy;

transferring heat to and/or from the upper and/or lower reservoir to maintain the temperature of the upper and/or lower reservoir within a defined operating range; and executing, by a computing arrangement, a predictive temperature control model, wherein the computing arrangement receives data related to the temperature of the upper and/or lower reservoir, determines a predicted temperature for the upper and/or lower reservoir using the predictive temperature control model, and activates a heat transfer device when the predicted temperature falls outside a defined operating range, wherein the heat transfer device comprises a heat pump, and wherein the heat transfer device comprises one or more pipes extending between the heat pump and the upper and/or lower reservoir.

18. The method of claim 17, comprising transferring heat generated by the turbine generator to the upper and/or lower reservoir.

19. The method of claim 17, comprising transferring heat from a geothermal borehole to the upper and/or lower reservoir and/or transferring heat from the upper and/or lower reservoir to a geothermal borehole.

* * * * *